US011797919B2

(12) United States Patent
Thakkar et al.

(10) Patent No.: US 11,797,919 B2
(45) Date of Patent: Oct. 24, 2023

(54) DOCUMENT-BASED DISTRIBUTED INVENTORY SYSTEM WITH REBALANCING

(71) Applicant: Adobe Inc., San Jose, CA (US)

(72) Inventors: Rishabh Saumil Thakkar, Plano, TX (US); William Jacob Kalter, Cedar Park, TX (US); Fahd Murtuza Siddiqui, Cedar Park, TX (US)

(73) Assignee: Adobe Inc., San Jose, CA (US)

( * ) Notice: Subject to any disclaimer, the term of this patent is extended or adjusted under 35 U.S.C. 154(b) by 851 days.

(21) Appl. No.: 16/679,039

(22) Filed: Nov. 8, 2019

(65) Prior Publication Data

US 2021/0142263 A1    May 13, 2021

(51) Int. Cl.
| | | |
|---|---|---|
| *G06F 17/00* | (2019.01) | |
| *G06Q 10/08* | (2023.01) | |
| *G06Q 10/06* | (2023.01) | |
| *G06Q 30/06* | (2023.01) | |
| *G06Q 10/087* | (2023.01) | |
| *G06F 16/93* | (2019.01) | |
| *G06F 16/23* | (2019.01) | |

(52) U.S. Cl.
CPC ....... *G06Q 10/087* (2013.01); *G06F 16/2329* (2019.01); *G06F 16/93* (2019.01)

(58) Field of Classification Search
CPC ... G06Q 10/087; G06F 16/2329; G06F 16/93; G06V 30/40
See application file for complete search history.

(56) References Cited

U.S. PATENT DOCUMENTS

| | | | | |
|---|---|---|---|---|
| 10,692,043 | B1* | 6/2020 | Woodyard | G07F 17/40 |
| 2003/0204450 | A1* | 10/2003 | Heinrichs | G06Q 10/087 |
| | | | | 705/28 |
| 2018/0218312 | A1* | 8/2018 | Smith | G06Q 30/0633 |

OTHER PUBLICATIONS

"Serverless database computing using Azure Cosmos DB and Azure Functions", Retrieved at: https://docs.microsoft.com/en-us/azure/cosmos-db/serverless-computing-database, Jul. 16, 2019, 11 pages.
"Transactions and optimistic concurrency control", Retrieved at: https://docs.microsoft.com/en-US/azure/cosmos-db/database-transactions-optimistic-concurrency, Jul. 22, 2019, 5 pages.

(Continued)

*Primary Examiner* — Talia F Crawley
(74) *Attorney, Agent, or Firm* — FIG. 1 Patents

(57) ABSTRACT

A distributed inventory system is made up of multiple regions, each of which includes a document-based database and an inventory management system. The document-based database maintains documents regarding inventory counts for different items of inventory. The inventory management system updates the inventory counts in the documents in its database in response to client requests (e.g., due to an item being ordered or returned by a customer) and in response to replication data received from other regions indicating changes to the inventory counts in the documents maintained in document-based databases in those other regions. Each region is assigned a particular inventory count for an item and can, in response to the inventory count in a region getting too low, rebalance the inventory count distribution by transferring inventory count from one region to another.

20 Claims, 12 Drawing Sheets

(56) References Cited

OTHER PUBLICATIONS

"Welcome to Azure Cosmos DB", Retrieved at: https://docs.microsoft.com/en-us/azure/cosmos-db/introduction, Jul. 22, 2019, 4 pages.
Golab, "Eventually Consistent: Not What You Were Expecting?", Feb. 18, 2014, 11 pages.
Mak, "Facebook Announces Apollo at QCon NY 2014", Jun. 13, 2014, 7 pages.
Shapiro, "A comprehensive study of Convergent and Commutative Replicated Data Types", Jan. 13, 2011, 51 pages.
Terry, "Replicated Data Consistency Explained Through Baseball", Oct. 2011, 14 pages.

\* cited by examiner

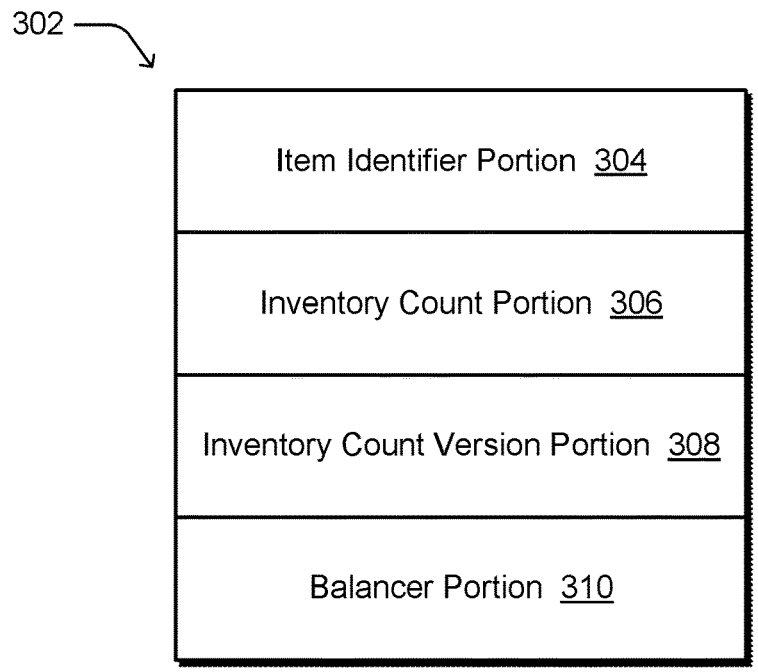
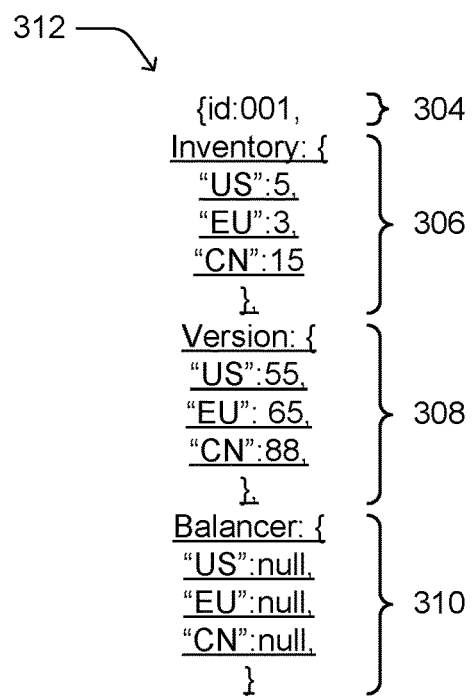
Fig. 3

DOCUMENT-BASED DISTRIBUTED INVENTORY SYSTEM WITH REBALANCING

BACKGROUND

As computer technology has advanced, computers have become increasingly commonplace in our lives and have found a wide variety of different uses. One such use is inventory management. Computers are used to maintain a database of inventory (e.g., products that a company sells). This provides various functionality, such as notifying customers around the world whether an item is available, notifying sellers when additional items should be ordered, and so forth.

Conventional solutions for inventory management, however, are not without their problems. One solution is to use a single write master inventory system in which multiple programs or computers can read from the database (or a read-only replica of the database) but only a single master (e.g., a program or computer) is able to write to the database. In such a system all writes to the database, such as to update the amount of inventory of an item in response to a sale of the item, are made by the single master. Although such a system may provide high consistency and fast data retrieval, all write requests from around the world have to be redirected to the single master where they are serialized and synchronized. This routing and synchronization of requests produces an uneven distribution of write latencies in order to maintain consistency of the data, and if the single write master fails, the entire inventory system is prone to being halted.

Other conventional solutions sacrifice data consistency for high system availability. In such systems writes to the database are asynchronously enqueued, or multiple replicas of the master are written to and synchronized at some time after the transaction has completed, either of which can lead to inventory being oversold. This inaccuracy leads to unhappy customers who receive emails saying the product purchased was actually out of stock due to an "internal error."

Thus, conventional solutions can have one or more of an uneven distribution of write latencies, down time due to single write master fails, and inconsistent data, resulting in dissatisfaction and frustration for both sellers and customers.

SUMMARY

To mitigate the drawbacks of conventional solutions for inventory management, a document-based distributed inventory system that rebalances inventory across regions is described. A document-based distributed database is maintained across the regions. A request to update an inventory count for an item by a first amount is received from a client. A first version of a document in the document-based database that indicates a current inventory count for the item assigned to the first region is checked to determine whether performing the request would result in the current inventory count for the item falling below zero. If it is determined that performing the request would result in the current inventory count for the item falling below zero, an indication of failure of the request is returned to the client without updating the current inventory count for the item by the first amount. A determining is also made when the inventory count falls below a threshold amount. In response to determining that the inventory count has fallen below the threshold amount, a first rebalance request is communicated to a second region of the distributed inventory system to transfer inventory count from the second region to the first region. This first rebalance request can come from within the database or an external monitor. A second version of the document indicating a transfer of a second amount of inventory count from the second region to the first region is received in response to the first rebalance request. The first version of the document is replaced with a third version of the document indicating an increase in the current first inventory count for the item by the second amount.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 illustrates an example document in the document-based database.

DETAILED DESCRIPTION

Overview

Figure 1:
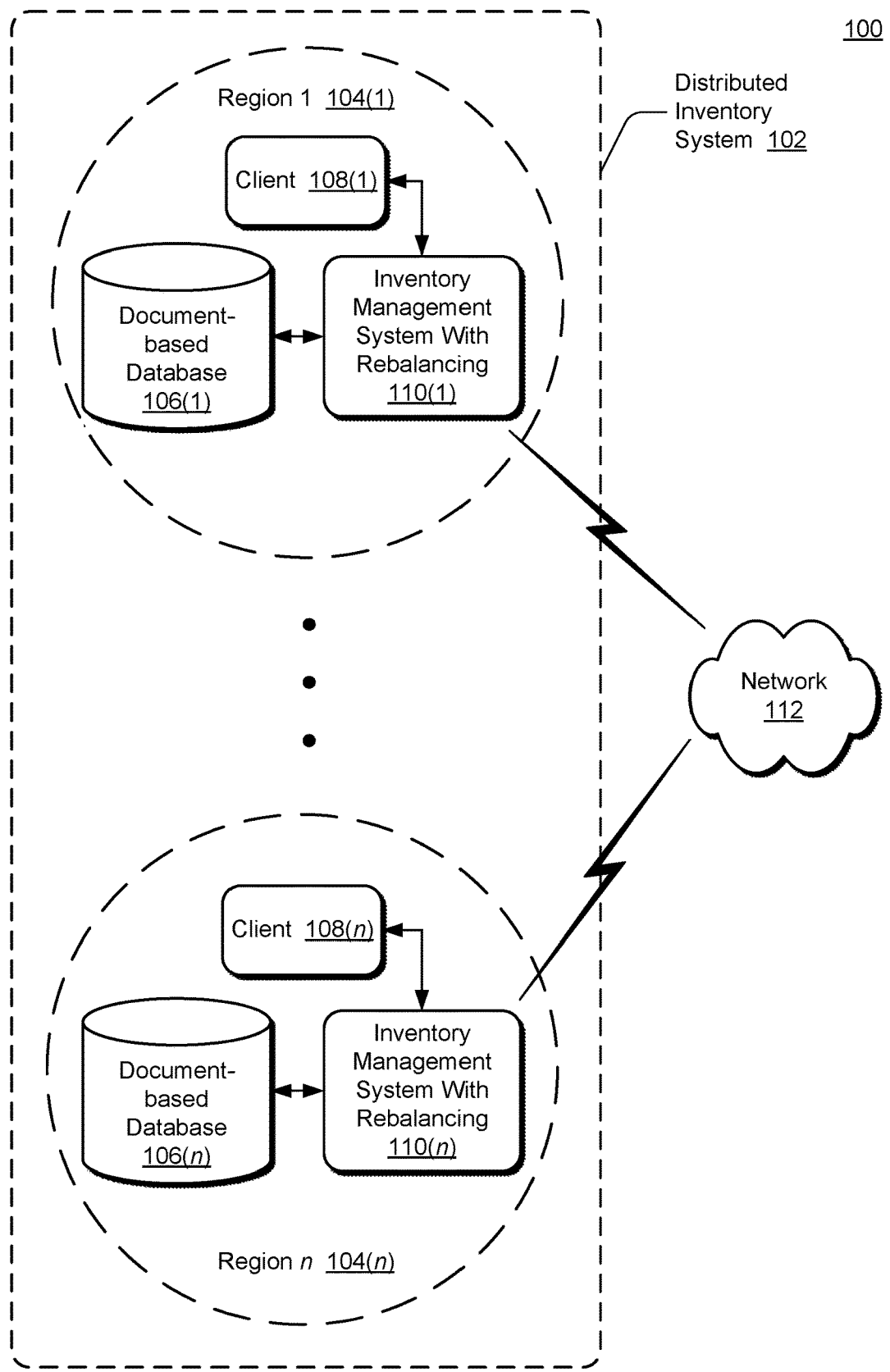
FIG. 1 is an illustration of a digital medium environment in an example implementation that is operable to employ the document-based distributed inventory system with rebalancing described herein.

Techniques for a document-based distributed inventory system with rebalancing are described herein. Generally, a distributed inventory system is made up of multiple regions, each of which includes a document-based database having an associated inventory management system with rebalancing. The document-based database maintains documents regarding inventory counts for different items of inventory. The inventory management system with rebalancing updates the inventory counts in the documents in its associated database in response to client requests (e.g., due to an item being ordered or returned by a customer) and in response to replication data received from other inventory management systems indicating changes to the inventory counts in the documents maintained in document-based databases in other regions. Updates to inventory in one region are synchronized with the other regions sometime after the update has been committed. Each region is assigned a particular inventory count for an item and the inventory management system can, in response to the inventory count for the region getting too low, rebalance the inventory count distribution by transferring inventory count from one region to another.

More specifically, the document-based database in a region includes multiple documents each corresponding to an item of inventory. The total inventory count for an item, which is how much of the item is currently available from the distributed inventory system, is split up among multiple regions. A document in the database describes various information regarding the inventory, such as an identifier of the item that the document corresponds to, an inventory count for the item assigned to each of the various regions, a current version of each of the inventory counts, and a balancer portion including information regarding rebalances of inventory count among the regions.

An inventory management system receives inventory count update requests from a client, such as due to item sales, item returns, additional items received from suppliers, and so forth. The inventory count update request identifies the item and an amount that the inventory count is to be increased or decreased. If the requested update would decrease the inventory count for the item below zero then the requested update is not performed. Otherwise, the requested update is performed by obtaining the document corresponding to the item from the database, updating the inventory count as indicated by the request, increasing the inventory count version in the document (e.g., incrementing the inventory count version by one), and writing the updated document back to the database.

It should be noted that these inventory count checks and updates are performed atomically on the database. Thus, any such check or update is performed within a single request or transaction with the database.

Changes to documents in the database are also replicated to (communicated to) the other regions in the distributed inventory system. For example, a document can be updated in a particular region by adjusting the portion of the document that represents the inventory count in that region, after which the entire new document is asynchronously updated in all other regions. This can result in conflicts, which are situations where a document is updated in two or more regions concurrently before replication to the other regions is complete. If a document is received from another region and there is no conflict between the received version of the document and the receiving region's version of the document, then the receiving region's version of the document can be replaced with the received version of the document. In situations in which a conflict between documents occurs, the documents are merged. Two versions of a document corresponding to an item are merged by the region generating an updated document by updating the inventory count for each region to be equal to the inventory count indicated by the two versions as having the highest inventory count version. The updated document is then written back to the database in this particular region. Eventually each region receives updates to inventory count changes in the other regions.

It should be noted that inventory updates at a region are serialized—they are performed in order of receipt at the document-based database so the document-based database will not see an out of order write request. The update to a document at each region is serialized, however updates across different documents need not be serialized. Furthermore, updates to different versions of the same document in different regions need not be serialized.

The inventory management systems also perform rebalancing to transfer inventory count among the regions in response to detecting that inventory count for an item becomes too low (e.g., drops below a threshold amount). In response to detecting that inventory count for an item is too low in one region, a balancer portion of the document corresponding to the item is updated to indicate a rebalance request. The rebalance request includes an identifier of the source region (also referred to as the originator of the rebalance), an identifier allowing different rebalances in documents corresponding to the same item to be distinguished from one another, an identifier of the target region, the amount of the inventory count transfer, and the inventory count version in which the target region fulfilled the inventory count transfer (which is a default value, such as "null", until the target region has fulfilled the inventory count transfer). The target region for the inventory count transfer is the region that will receive the inventory count and the source region for the inventory count transfer is the region that will send the inventory count.

The document with the rebalance request is eventually communicated to the source region and the inventory management system associated with the source region checks whether it is permissible to transfer the requested inventory count to the target region. In one or more implementations, the transfer of the inventory count is only permissible if both 1) there is not already a rebalance for the item in process originating from the source region and 2) the transfer would not cause the inventory count at the source region to be too low (e.g., less than a threshold amount). If it is not permissible to transfer the requested inventory count to the target region, then the inventory management system associated with the source region updates the balancer portion of the document to indicate that the request is rejected (e.g., by deleting the rebalance request). The document with the rebalance request rejection indication is eventually replicated to the target region, informing the target region that the requested inventory count transfer was rejected.

If it is permissible to transfer the requested inventory count to the target region then the inventory management system associated with the source region updates the inventory count in the document obtained from the database at the source region to reflect the transfer (e.g., decrements the inventory count by the requested transfer amount) and includes the rebalance request in the document. The inventory count version of the document obtained from the database is also increased to reflect the transfer, analogous to increasing the inventory count version in response to an inventory count update request.

The updated document is written back to the database in the source region and is eventually communicated to the target region during the document replication process. The target region receives the updated document and replaces or merges its version of the document with the received document. The balancer portion of the document is updated to indicate a version that is the inventory count version in which the rebalance was fulfilled (whatever the inventory count version was increased to at the target region at the time the inventory count was increased by the transferred inventory count). Eventually, the document updated at the target region is communicated to the source region. When the inventory management system associated with the source region sees a document that has an inventory count version for the target region that is equal to or greater than the inventory count version in the balancer portion, the inventory management system knows that the transfer has been fulfilled at the target region. The balancer portion is then no longer needed, so the inventory management system associated with the source region replaces or merges the version of the document in the database of the source region with the received document, updates the document to delete the balancer portion, and writes the updated document to the database in the source region.

Eventually the document with the balancer portion deleted is communicated to the target region. The inventory management system associated with the target region replaces or merges its version of the document with the received document, and updates the document to delete the balancer portion. Accordingly, both source and target regions know that the rebalance was fulfilled and the versions of the documents at both regions no longer have the balancer portion.

The techniques discussed herein provide a distributed inventory system having high availability due to each region being able to serve as a write master combined with high consistency because the inventory count does not reach an impossible state (e.g., does not go below zero). By assigning inventory counts to particular regions in an eventually consistent system, the distributed inventory system allows quick reads and writes to the databases in the regions without having to block any requests to maintain consistency.

Furthermore, the rebalancing of inventory counts among regions allows the distributed inventory system to be dynamic and adapt to different inventory count needs in different regions. Rather than each region having its own independent database and inventory management system, the inventory management systems work together to make the total inventory count for the distributed inventory system available.

Term Descriptions

These term descriptions are provided for purposes of example only and are not intended to be construed as limiting on the scope of the claims.

The term "item" refers to an object the number of which can be tracked. For example, an item can be products in a distribution warehouse that customers can purchase, digital content (e.g., digital media, applications) that customers can purchase or use, and so forth.

The term "inventory" refers to a collection of items that are available. For example, an item of inventory may be a book titled "History" and there may be hundreds of copies of that book in a distribution warehouse.

The term "document" refers to a single record that can be stored in a database and includes information regarding an item. For example, a document can include an identifier of the item that the document corresponds to, an inventory count for the item assigned to each of various regions, a current version of each of the inventory counts, and a balancer portion including information regarding rebalances of inventory count among the regions.

The term "document-based database" refers to a database that maintains data as a set of documents, e.g., as opposed to a table with a fixed schema of independently accessible and modifiable attributes. Each document can correspond to a different item.

The term "distributed inventory system" refers to a collection of multiple databases where transactions have atomic guarantees within a single database and are eventually replicated to the other databases. For example, different databases of a distributed inventory system can be situated in different states, in different countries, and so forth.

The term "region" refers to a division or portion of a distributed inventory system, and includes the physical area where a single database's hardware is located as well as optionally supporting modules or systems to access and update the database. This accessing and updating can be to change information in the database in response to customer requests, in response to requests from other regions, and so forth.

The term "balancer portion" or "balancer" refers to a collection of information in a document regarding transferring of inventory count among the regions. For example, the balancer includes an identifier of the balancer, an identifier of the source region for an inventory count transfer, an identifier of the target region for the inventory count transfer, the amount of the inventory count transfer, and the inventory count version in which the target region fulfilled the inventory count transfer.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the document-based distributed inventory system with rebalancing described herein. The illustrated environment 100 includes a distributed inventory system 102 having multiple (n) regions 104(1), . . . , 104(n). Each region 104 refers to a division or portion of the distributed inventory system 102 and includes the physical area where a single database's hardware is located. The different regions 104 can be defined by a designer or user of the distributed inventory system 102 in any manner desired. For example, the different regions can be political divisions (e.g., different countries), geographic divisions (e.g., different countries), distribution divisions (e.g., different distribution centers for shipping items), and so forth.

Each region 104 includes a document-based database 106 and at least one client 108. The document-based database 106 maintains documents regarding inventory counts for different items. Each region 104 is assigned a particular inventory count for an item, and can rebalance the inventory count distribution by transferring inventory count from one region to another as discussed in more detail below.

Each document-based database 106 is implemented by at least one computing device. Regardless of how many computing devices implement a document-based database 106, each document-based database 106 serializes updates or requests received from a client 108. Computing devices that are usable to implement a document-based database 106 may be configured in a variety of ways. A computing device, for instance, may be configured as a server computer, a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to low resource devices with limited memory and/or processing resources (e.g., mobile devices). Additionally, a computing device may be representative of a plurality of different devices, such as multiple servers utilized by a business to perform operations "over the cloud" as further described in relation to FIG. 9.

In one or more implementations, each client 108 communicates requests to update the inventory count for an item in the database 106 in the same region as that client 108. Additionally or alternatively, a client 108 can select a different database 106 to communicate a request to update the inventory count for an item in different manners, such as the database 106 for which the network latency between the database 106 and the client 108 is the lowest. The inventory count for an item can be incremented or decremented in response to various events, such as ordering of the item by a customer, returning of the item by a customer, receipt of additional items from a supplier or manufacturer, and so forth. Each client 108 is, for example, a program or module of a computing device, which can be configured in a variety of ways analogous to the discussion above regarding the document-based database 106. Although in FIG. 1 one client 108 is illustrated in each region 104, it should be noted that each region 104 can include any number of clients 108, and that a client external to a particular region can communicate requests to update inventory count for an item in the database 106 of that particular region.

Each region 104 also has an associated inventory management system with rebalancing 110. The inventory management system with rebalancing 110 responds to requests received from a client 108 to update the inventory count, performing or rejecting the requests as appropriate. Additionally, the inventory management system with rebalancing 110 of a region 104 manages communicating documents updated at that document-based database 106 in that region to other regions, and rebalancing the inventory count distribution by transferring inventory count from one region to another as discussed in more detail below.

The inventory management systems 110 communicate with one another via a network 112. The network 112 can be a variety of different networks, including the Internet, a local area network (LAN), a public telephone network, an intranet, other public and or proprietary networks, combinations thereof, and so forth.

Segment Targeting System Architecture

Figure 2:
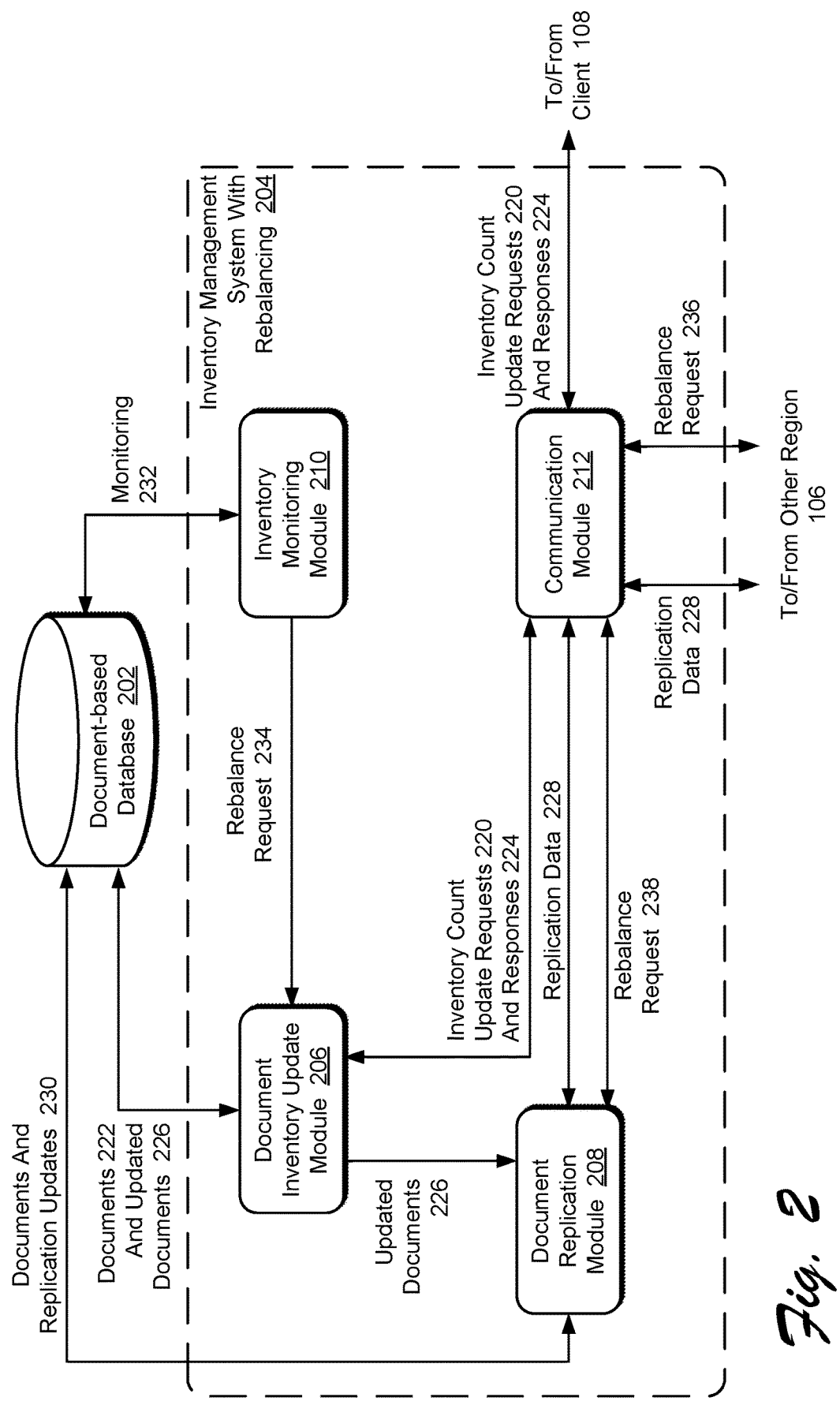
FIG. 2 is an illustration of an example architecture of a database monitored by a rebalancing inventory management system.

FIG. 2 is an illustration of an example architecture of a document-based database 202 monitored by a rebalancing inventory management system 204. The document-based database 202 is an example of any of the document-based databases 106 of FIG. 1. The document-database 202 includes a document-based database 202 storing multiple documents each corresponding to an item of inventory. There can be multiple copies of each item of inventory. For example, an item of inventory may be a book titled "History" and there may be hundreds of copies of that book in a distribution warehouse.

FIG. 3 illustrates an example document in the document-based database 202. An example document 302 is illustrated as including an item identifier portion 304, an inventory count portion 306, an inventory count version portion 308, and a balancer portion 310. The item identifier portion 304 includes an identifier of the item that the document 302 corresponds to. Any of a variety of different identifiers can be used that allow different items within the distributed inventory system 102 to be distinguished from one another.

In one or more implementations the item identifier portion 304 includes a universally unique identifier (UUID).

The inventory count portion 306 includes multiple values indicating an inventory count for the item assigned to each of the various regions 104. It should be noted that for a particular region 104 the inventory count portion 306 includes a current inventory count for that particular region and a most recently received inventory count for other regions 104. As discussed in more detail below, as a result of the manner in which regions are notified of changes in inventory counts at other regions, each region may not have an accurate up-to-date inventory count for other regions.

The total inventory count for an item, which is how much of the item is currently available from the distributed inventory system 102, is split up among multiple regions. How the inventory count is split up among the multiple regions can be determined in a variety of different manners desired (e.g., by a developer or administrator of the distributed inventory system 102). For example, the inventory count can be split up based on the sizes (e.g., in terms of geographic area or number of customers) for each region so that regions serving larger geographic areas or numbers of customers receive more inventory count than regions serving smaller geographic areas or numbers of customers. By way of another example, the inventory count can be split up among the regions approximately equally.

The inventory count version portion 308 includes a value indicating a current version of each of the inventory counts in the inventory count portion 306. The current versions are increasing values, such as monotonically increasing values, which are updated each time a corresponding inventory count is updated. These current versions are used to determine, when merging two versions of the document 302, which inventory count is most recent.

The balancer portion 310 includes information regarding rebalances of inventory count among the regions, also referred to as a balancer. For each rebalance, this information includes, for example, an identifier of the rebalance, an amount of inventory count being transferred, an identifier of the region that the inventory count is being transferred from, an identifier of the region that the inventory count is being transferred to, and the inventory count version in which the inventory management system associated with the target region fulfilled the inventory count transfer. The balancer portion 310 is used to transfer inventory count from one region to another as discussed in more detail below.

Another example document 312 is also illustrated. The example document 312 includes the item identifier portion 304 indicating that the item identifier is "001". The inventory count portion 306 indicates that the inventory count for a region named "US" is 5, the inventory count for a region named "EU" is 3, and the inventory count for a region named CN" is 15. The inventory count version portion 308 indicates that the version of the inventory count for the region named "US" is 55, the version of the inventory count for the region named "EU" is 65, and the version of the inventory count for the region named "CN" is 88. The balancer portion 310 indicates that there are no rebalances currently being formed (via the indicator "null") from the "US" region, the "EU" region, or the "CN" region.

It should be noted that the inventory count portion 306 and the inventory count version portion 308 can be updated only by the region 104 corresponding to those portions. For example, only the inventory management system associated with the "US" region can update the inventory count and the inventory count version for the "US" region. However, multiple regions 104 can update the balancer portion 310 as discussed in more detail below.

Returning to FIG. 2, the document-based database 202 has an associated inventory management system with rebalancing 204, which includes a document inventory update module 206, a document replication module 208, an inventory monitoring module 210, and a communication module 212. Generally, the document inventory update module 206 updates the inventory count of items based on input from the client 108, such as due to item sales, item returns, additional items received from suppliers, and so forth. The document replication module 208 manages replication of documents to databases in other regions, merging multiple versions of a document, and updating the database 202 in response to replication messages from inventory management systems associated with other regions. The inventory monitoring module 210 monitors documents in the database 202 and sends a rebalance request in response to detecting that inventory count for an item becomes too low (e.g., drops below a threshold amount). The communication module 212 manages communication of documents between the inventory management system 204 and inventory management systems of other regions as well as between the inventory management system 204 and a client 108, sending and receiving replication messages, rebalancing messages, and so forth.

The inventory management system with rebalancing 204 can be situated at the same physical location (e.g., on the same computing devices) as the document-based database 202 or at a different location. Furthermore, the modules 206-212 can be implemented on the same computing device or different computing devices.

The distributed inventory system 102 provides serializable consistency within each database and eventual consistency across databases. Serializable consistency within a database refers to database read requests not seeing out of order write requests. Requests to the database 202 are performed by the database 202 in the order of receipt at the database 202—there may be delays in performing the requests but the requests will not be performed out of order (e.g., the requests are serialized). Eventual consistency across databases refers to document changes made at one database (whether as part of a rebalance request or other document update as discussed in more detail below) are eventually communicated to the other databases. Accordingly, for a given item, the corresponding documents in the various databases will eventually become consistent. The distributed inventory system 102 is thus also referred to as an eventually consistent system.

The document inventory update module 206 updates the inventory count of items based on inventory count update requests 220 received from the client 108. An inventory count update request 220 identifies the item and how much to increase or decrease the inventory count by. The communication module 212 provides the inventory count update request 220 to the document inventory update module 206. In response to the inventory count update request 220 the document inventory update module 206 obtains the document 222 corresponding to the item identified in the request 220 from the database 202 and checks whether the requested update can be performed. In one or more implementations, if the requested update would decrease the inventory count for the item below zero then the requested update cannot be performed; otherwise, the requested update can be performed.

If the requested update cannot be performed then the document inventory update module 206 returns a failure response 224 to the communication module 212. The communication module 212 returns the failure response 224 to the client 108. This allows the client 108 to take an appropriate action (e.g., notify a customer that an item order was not successful due to insufficient inventory). It should be noted that if the requested update cannot be performed the document inventory update module 206 does not change the document and thus the document need not be written back to the database 202.

If the requested update can be performed then the document inventory update module 206 updates the inventory count in the document 222 as indicated by the request 220, increases the inventory count version in the document 222 (e.g., increments the inventory count version by one), and writes the document back to the database 202 as an updated document 226. The updated document 226 written back to the database 202 replaces (e.g., overwrites) the previous version of the document that was obtained from the database 202 by the document inventory update module 206. The document inventory update module 206 returns a success response 224 to the communication module 212. The communication module 212 returns the success response 224 to the client 108. This allows the client 108 to take an appropriate action (e.g., notify a customer that an item order was successful).

The document replication module 208 manages replication of documents to databases in other regions, merging of multiple versions of a document, and updating the database 202 in response to replication messages from inventory management systems in other regions. The document replication module 208 identifies changes to documents in the database 202. In one or more implementations, the document inventory update module 206 provides the updated document 226 for each inventory count update to the document replication module 208, thus giving the document replication module 208 each updated document that the document inventory update module 206 writes to the database 202.

The document replication module 208 provides the updated document 226 as replication data 228 to the communication module 212. The communication module 212 communicates the replication data 228 to the inventory management systems associated with each of the other regions 104 (also referred to herein as communicating the replication data 228 to the other regions), thereby notifying the inventory management systems associated with each of the other regions 104 of the new inventory count for the region including the database 202.

The communication module 212 also receives replication data 228 from the inventory management systems associated with other regions 104, which are copies of documents from the databases in other regions 104 notifying the inventory management system 204 of updates to the inventory counts for items in those other databases. The communication module 212 provides the received replication data 228 to the document replication module 208, which merges the version of the document received as replication data 228 with the version of the document in the database 202 (the document in the database 202 corresponding to the same item as the received replication data 228). Additionally or alternatively, if the only difference between the received replication data 228 and the version of the document in the database 202 is an inventory count change and corresponding inventory count version change (with the received replication data 228 having a higher inventory count version) for a region other than the region including the database 202, then the document replication module 208 can simply replace (e.g., over-write) the version of the document in the database 202 with the received replication data 228.

It should be noted that communication of replication data between the inventory management systems associated with different regions is performed by the communication modules in those inventory management systems. Although performed by the inventory management systems associated with the regions, this communication is also referred to as communicating replication data between the regions.

The document replication module 208 merges the two versions of the document by obtaining the version of the document from the database 202. For each inventory count in the two versions of the document, the document replication module 208 uses the inventory count having the highest inventory count version. The document replication module 208 updates the inventory counts and inventory count versions as appropriate and writes 230 the merged version of the document back to the database 202, replacing (e.g., overwriting) the previous version of the document that was obtained from the database 202 by the document replication module 208.

Figure 4:
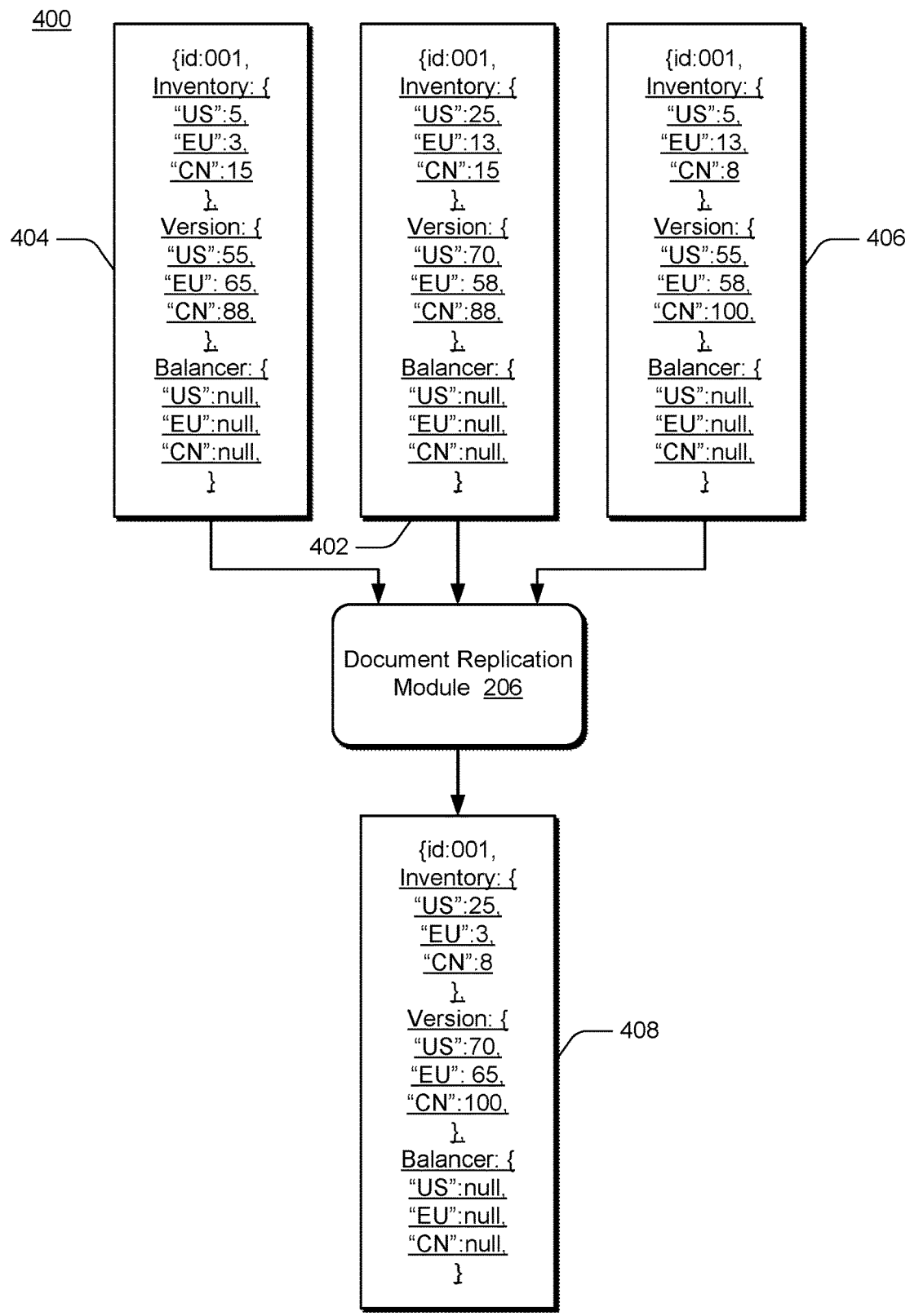
FIG. 4 illustrates an example of merging multiple versions of a document.

FIG. 4 illustrates an example 400 of merging multiple versions of a document. Assume in the example 400 that the document replication module 208 obtains a version 402 of the a document from the database 202, and also receives versions 404 and 406 of the document from two other regions 104. For each inventory count in the versions 402-406, the document replication module 208 uses the inventory count having the highest inventory count version. As can be seen from the versions 402-406, for the region "US" version 402 has the highest inventory count version (70), for the region "EU" version 404 has the highest inventory count version (65), and for the region "CN" version 406 has the highest inventory count version (100). Accordingly, the document replication module 208 generates the version 408 of the document by taking the version 402, replacing the region "EU" inventory count and inventory count version with the inventory count (3) and inventory count version (65) from the version 404, and replacing the region "CN" inventory count and inventory count version with the inventory count (8) and inventory count version (100) from the version 406. The document replication module 208 writes back the version 408 to the database 202, replacing the version 402.

Returning to FIG. 2, it should be noted that in one or more implementations there is no specific time requirement for the document replication module 208 to send the replication data 228. The distributed inventory system 102 is referred to as an eventually consistent system, meaning that eventually changes to the documents in the database 202 will be communicated to the other inventory management systems of the other regions 104. It is expected that there will not be too long of a delay (e.g., weeks), but if there is network congestion or a high workload at the database 202 or inventory management system 204 due to requests from the client 108, a delay of minutes or hours in communicating the replication data 228 to the inventory management systems associated with the other regions 104 does not break the distributed inventory system 102. Delays in communicating the replication data 228 to the other regions 104 may delay rebalance requests due to the other regions having out-of-date inventory counts for the region including the database 202, but despite the delay the overall inventory count for an item in the distributed inventory system 102 will not drop below zero.

The inventory monitoring module 210 monitors 232 documents in the database 202 and detects when inventory count for an item drops below a threshold amount. The inventory monitoring module 210 can monitor the database 202 in a variety of different manners. In one or more implementations, the document inventory update module 206 notifies the inventory monitoring module 210 of each inventory count update that the document inventory update module 206 performs. Accordingly, the inventory monitoring module 210 can check, each time an inventory count is updated, whether the inventory count drops below the threshold amount. Additionally or alternatively, the inventory monitoring module 210 can monitor the inventory counts in other manners, such as polling the database 202 at regular or irregular intervals (e.g., every 5 minutes) to obtain the documents and check the inventory counts.

The threshold amount can be set in any of a variety of different manners. In one or more implementations, the threshold amount is set to a level that, based on previous inventory counts for the item, the rebalance is expected to be completed prior to the inventory count for the item dropping to zero. Additionally or alternatively, various other factors can be taken into account in setting the threshold amount, such as how quickly the inventory count is changing in databases in different regions (e.g., setting the threshold amount higher if the inventory count for the item is decreasing in database 202 faster than the databases in other regions, and setting the threshold amount lower if the inventory count for the item is decreasing in database 202 slower than the databases in other regions).

In response to detecting that inventory count for an item drops below the threshold amount, the inventory monitoring module 210 sends a rebalance request 234 to the document inventory update module 206. The rebalance request 234 is a request identifying an item, an indication that the request is a rebalance request, an inventory count to be transferred, a source region for the inventory count transfer, and the target region for the inventory count transfer. The target region for the inventory count transfer is the region that includes the database 202. The source region for the inventory count transfer can be identified in any of a variety of different manners, such as the region having the largest inventory count for the item (as indicated by the document in the database 202 corresponding to the item).

The inventory count to be transferred can be determined in any of a variety of different manners. For example, the inventory count can be a fixed number, such as an amount equal to the threshold amount that the inventory monitoring module 210 monitors documents for or the inventory count that was initially assigned to the region that includes the database 202. By way of another example, the inventory count can be a variable number, such as 10% of the inventory count of the source region.

The document inventory update module 206 obtains the document corresponding to the item identified in the rebalance request from the document-based database 202 and updates the balancer portion of the document to indicate a rebalance request. The rebalance request includes an identifier of the source region (also referred to as the originator of the rebalance), an identifier allowing different rebalances in documents corresponding to the same item to be distinguished from one another, an identifier of the target region, the amount of the inventory count transfer, and the inventory count version in which the target region fulfilled the inventory count transfer (which is a default value, such as "null", until the target region has fulfilled the inventory count transfer).

The document inventory update module 206 provides the updated document 226 to the document replication module, which provides the updated document 226 as replication data 228 to the communication module 212. The communication module 212 communicates the replication data 228 to each of the other regions 104, thereby notifying the inventory management systems associated with each of the other regions 104 of the rebalance request.

The communication module 212 also receives rebalance requests 236 from the inventory management systems associated with other regions 104 (also referred to herein as receiving the rebalance requests from the other regions 104). The communication module 212 forwards a received rebalance request 236 to the document replication module 208 as a rebalance request 238. In response to the rebalance request 238, the document replication module 208 obtains the document corresponding to the item (as indicated in the rebalance request 238) from the database 202 and checks whether it is permissible to transfer the requested inventory count to the target region.

In one or more implementations, the distributed inventory system 102 limits each region 104 to, for each item, having only one rebalance in process at a time originating from that region. Accordingly, the document replication module 208 checks whether it is permissible to transfer the requested inventory count by checking whether there is already a rebalance for the item in process originating from the inventory management system 204 (based on the balancer portion of the document obtained from the database 202). If there is already a rebalance for the item in process originating from the inventory management system 204 then the transfer is not permissible. By permitting only a single rebalance for an item originating from the region to be pending potential repeats of rebalance requests are avoided. Additionally or alternatively, the document replication module 208 checks whether it is permissible to transfer the requested inventory count by checking whether the transfer would cause the inventory count for the region including the database 202 to be less than a threshold amount (e.g., the same threshold amount used by the inventory monitoring module 210). If the transfer would cause the inventory count for the region including the database 202 to be less than the threshold amount then the transfer is not permissible. This prevents the inventory management system 204 from performing the inventory count transfer just to follow up with sending a rebalance request because the inventory count fell below the threshold amount. In one or more implementations, the transfer of the inventory count is only permissible if both there is not already a rebalance for the item in process originating from the region including the database 202 and the transfer would not cause the inventory count for the region including the database 202 to be less than the threshold amount.

If it is not permissible to transfer the requested inventory count to the target region, the document replication module 208 does not perform the inventory count transfer and updates the balancer portion of the document to indicate that the request is rejected (e.g., by deleting the rebalance request from the balancer portion of the document). The document replication module 208 also provides the updated document as replication data 228 to the communication module 212, analogous to documents updated in response to inventory count update requests. The communication module 212 provides the replication data 228 to each of the other regions 104, thereby notifying the inventory management systems associated with each of the other regions 104 that the request was rejected. It should be noted that if the only difference between the received version of the document and the version of the document in the document-based database 202 is the rebalance request, the received version of the document need not be written to the document-based database 202. However, if there are additional differences between the received version of the document and the version of the document in the document-based database 202 (e.g., inventory count and inventory count version updates) then the received version of the document replaces or is merged with the version of the document in the document-based database 202.

If it is permissible to transfer the requested inventory count to the target region then the document replication module 208 updates the inventory count in the document obtained from the database 202 to reflect the transfer (e.g., decrements the inventory count in the document by the requested inventory count). The document replication module 208 also increases the inventory count version of the document obtained from the database 202 to reflect the transfer, analogous to the document inventory update module 206 increasing the inventory count version in response to an inventory count update request.

The document replication module 208 replaces the document in the database 202 with the updated document. The document replication module 208 also provides the updated document as replication data 228 to the communication module 212, analogous to documents updated in response to inventory count update requests. The communication module 212 provides the replication data 228 to each of the other regions 104, thereby notifying the inventory management systems associated with each of the other regions 104 of the new inventory count for the region including the database 202.

The target region receives the updated document and replaces or merges its version of the document with the received document. As part of this replacing or merging the balancer portion is updated to indicate a version that is the inventory count version in which the rebalance was fulfilled (whatever the inventory count version was increased to at the target region at the time the inventory count was increased by the transferred inventory count). The inventory management system associated with the target region knows that the rebalance request was granted because in the received document the inventory count version for the source region is greater than the inventory count version for the source region in the version of the document in the target region database.

Eventually, the document updated at the target region is replicated back to the inventory management system 204. When the document replication module 208 receives a document that has an inventory count version that is equal to or greater than the inventory count version in the balancer portion, the document replication module 208 knows that the transfer has been fulfilled at the target region. The balancer portion is then no longer needed, so the document replication module 208 updates the document to delete the balancer portion and replaces or merges the document in the database 202 with the received document. In one or more implementations only the originator of a rebalance can delete the balancer portion identifying the rebalance.

Eventually the document with the balancer portion deleted is replicated back to the target region. The inventory management system associated with the target region replaces or merges its version of the document with the received document, thus removing the balancer portion identifying the rebalance. Accordingly, both source and target regions know that the rebalance was fulfilled and the versions of the documents in the databases in both regions no longer have the balancer portion identifying the rebalance.

Figure 5A:
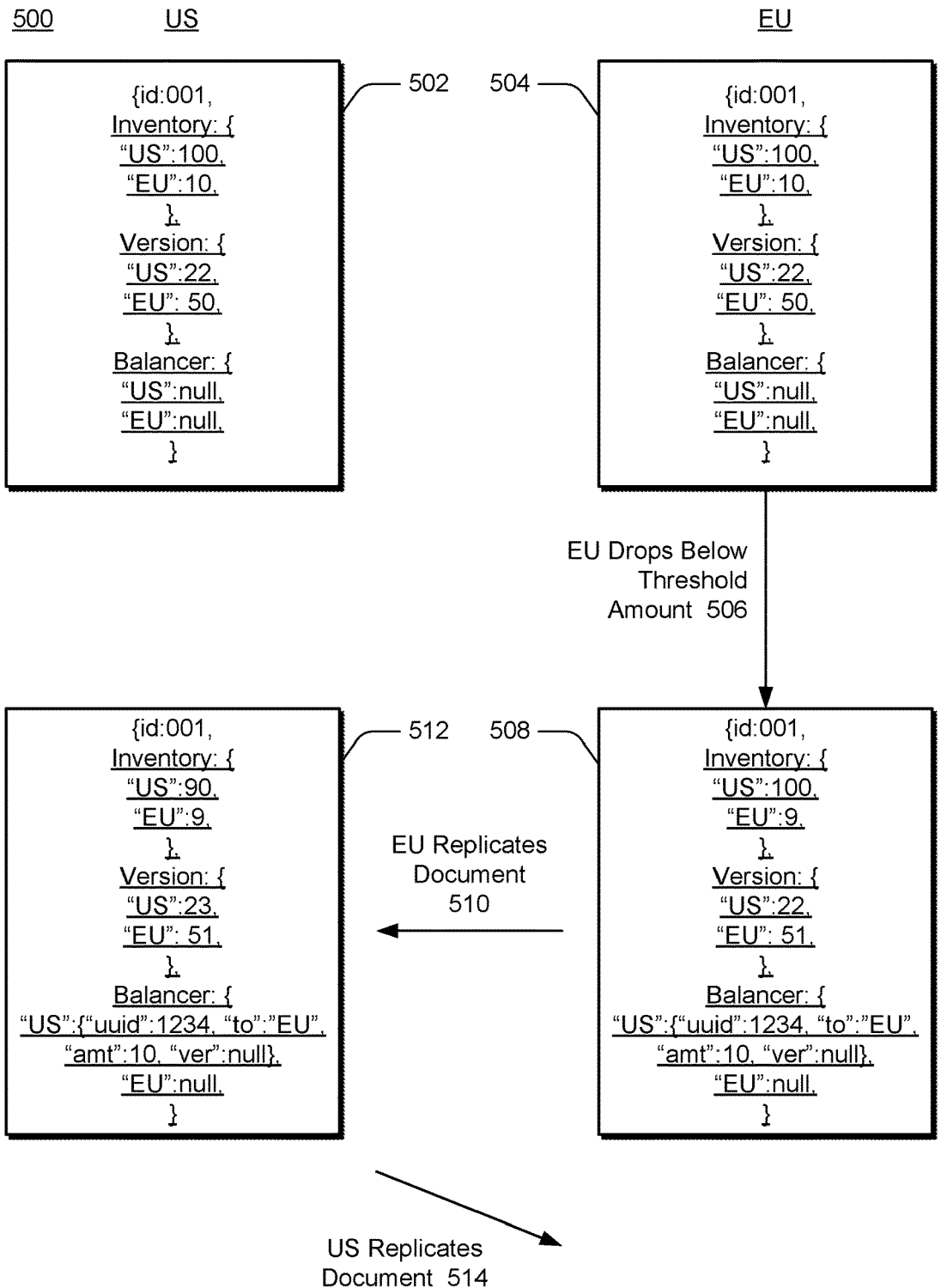
FIGS. 5A and 5B illustrate an example of rebalancing inventory count between two regions.
Figure 5B:
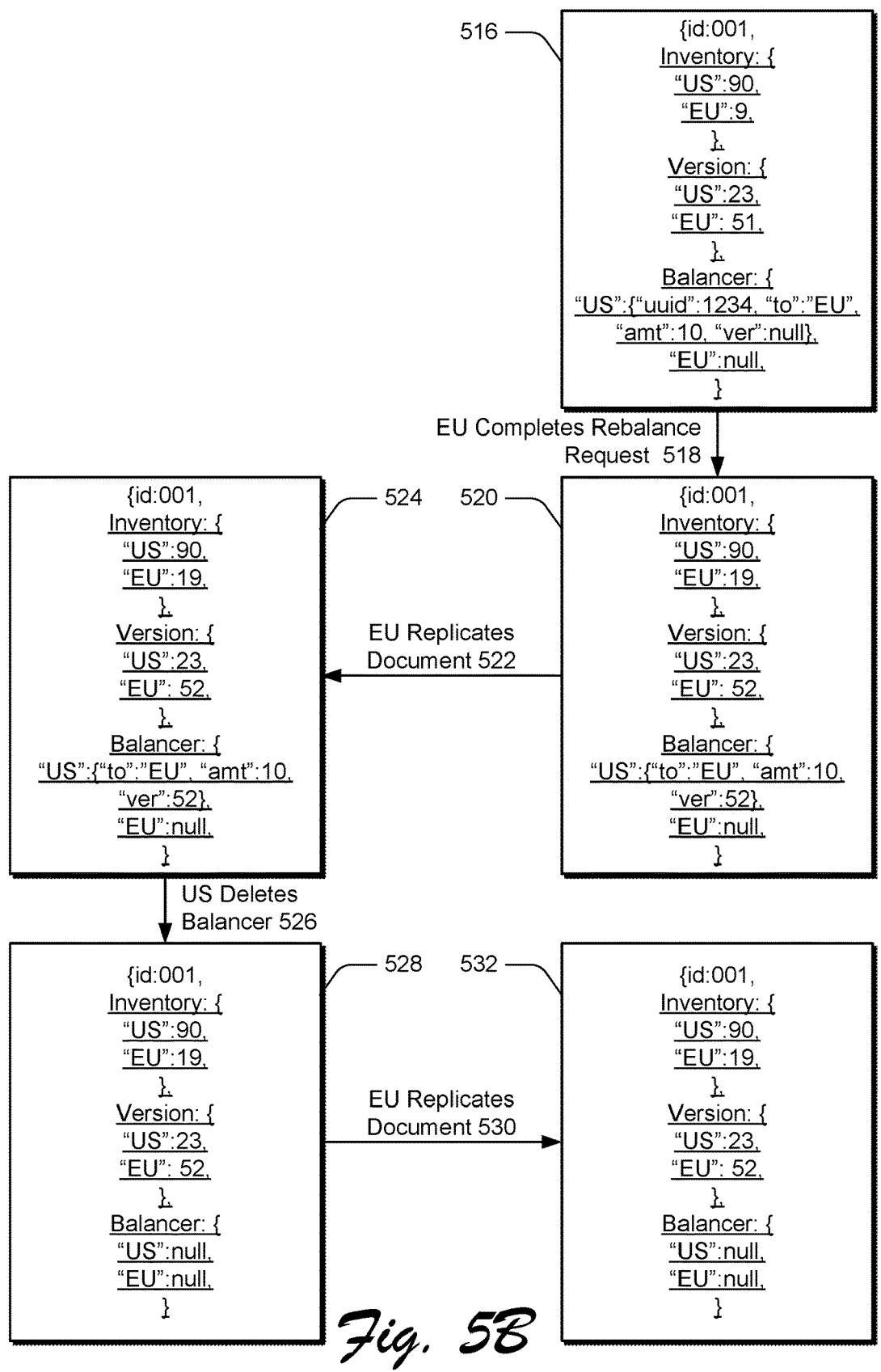

FIGS. 5A and 5B illustrate an example 500 of rebalancing inventory count between two regions. In the example 500, documents in the database of one region (referred to as the US region) are on the left side of FIGS. 5A and 5B, and documents in the database of a second region (referred to as the EU region) are on the right side of FIGS. 5A and 5B. Initially, both the US region and the EU region have the same version of the document, versions 502 and 504, respectively. It should be noted, however, that the two regions need not have the same version of the document to initiate a rebalance.

The EU region drops below a threshold amount 506. For example, the threshold amount can be 10 and an inventory count update request received at the inventory management system associated with the EU region causes the inventory count at the EU region to drop to 9, as illustrated by document 508. The EU region updates the document 504 to document 508, which includes a rebalance request. As illustrated the rebalance request is reflected in the balancer portion as "US": {"uuid":1234, "to":"EU", "amt":10, "ver": null}, indicating that the requested source region (the originator of the rebalance) is the US region, the rebalance has an identifier (UUID) of 1234, the requested target region is the EU region, the requested amount of the inventory count transfer is 10, and the version in which the target region fulfilled the transfer is "null" because the EU region has not yet updated the EU inventory count to reflect the transfer.

The document 508 is replicated 510 to the inventory management system associated with the US region so the document 512 received at the US region has an EU inventory count of 9. The document replication module at the US region detects that the balancer portion in the received document 512 identifies a rebalance from the US region that is not included in the balancer portion of the document in the US region database (e.g., document 502) and thus determines that document 512 includes a rebalance request from the EU region. The US region has determined that the requested transfer is permissible, so the US inventory count is 90 to reflect the transfer of the requested 10 inventory count to the EU region.

The document 512 is replicated 514 to the inventory management system associated with the EU region, shown as document 516 in FIG. 5B. The document replication module at the EU region detects that the inventory count version for the US region in the received document 516 is greater than the inventory count version for the US region in the document in the EU region database (e.g., document 508) and thus determines that the US region has granted the rebalance request. The EU region completes the rebalance request 518 by fulfilling the transfer, which refers to updating the EU inventory count by the transfer amount. This is illustrated at document 520. The EU inventory count has been increased by the transfer amount (10) and the version in the balancer portions is updated to reflect that the version in which the EU region fulfilled the transfer is the inventory count version in which the EU inventory count was increased by the transfer amount (which is 52 in the illustrated example).

The document 520 is replicated 522 to the inventory management system associated with the US region, shown as document 524. The document replication module at the US region detects that the version in the balancer portion is equal to or greater than the inventory count version for the EU region and thus determines that the EU region has fulfilled the transfer. Accordingly, the balancer portion is no longer needed and the document replication module at the US region deletes the balancer portion 526, resulting in document 528. The document 528 is replicated 530 to the inventory management system associated with the EU region, shown as document 532.

Situations can arise in which at least one of two versions of a document that the document replication module 208 is merging has a balancer portion indicating a rebalance request. These balancer portions can be in different states (e.g., pending or completed) and can have different data (e.g., different identifiers, different inventory count transfer amounts). Various rules are applied as follows to merge two such versions of a document.

In situations in which a first version of the document has a pending rebalance request and a second version of the document does not have a rebalance request, the inventory count version of the source region is checked. If the first version of the document has a higher inventory count version than the second version of the document then the merged document includes the pending rebalance request. However, if the second version of the document has a higher inventory count version than the first version of the document then the merged document does not have a pending rebalance request.

In situations in which both a first version and a second version of the document have a pending rebalance request, the inventory count version of the source region is checked. If the first version of the document has a higher inventory count version than the second version of the document then the merged document includes the pending rebalance request from the first version of the document. However, if the second version of the document has a higher inventory count version than the first version of the document then the merged document includes the pending rebalance request from the second version of the document.

In situations in which both a first version and a second version of the document have a rebalance request in the completed state (the rebalance request has been fulfilled), the inventory count version of the source region is checked. If the first version of the document has a higher inventory count version than the second version of the document then the merged document includes the completed rebalance request from the first version of the document. However, if the second version of the document has a higher inventory count version than the first version of the document then the merged document includes the completed rebalance request from the second version of the document.

In situations in which a first version of the document has a pending rebalance request and a second version of the document has a rebalance request in the completed state, the identifiers in the rebalance requests are checked. If the identifiers in the first version and the second version of the document are the same, the same rebalance request is being replicated and the newer version indicating that the rebalance request is completed is included in the merged document. However, if the identifiers in the first version and the second version of the document are not the same, the source region has deleted one of these two rebalance requests. Accordingly, the inventory count version of the source region is checked. If the first version of the document has a higher inventory count version than the second version of the document then the merged document includes the rebalance request from the first version of the document. However, if the second version of the document has a higher inventory count version than the first version of the document then the merged document includes the rebalance request from the second version of the document.

Figure 6:
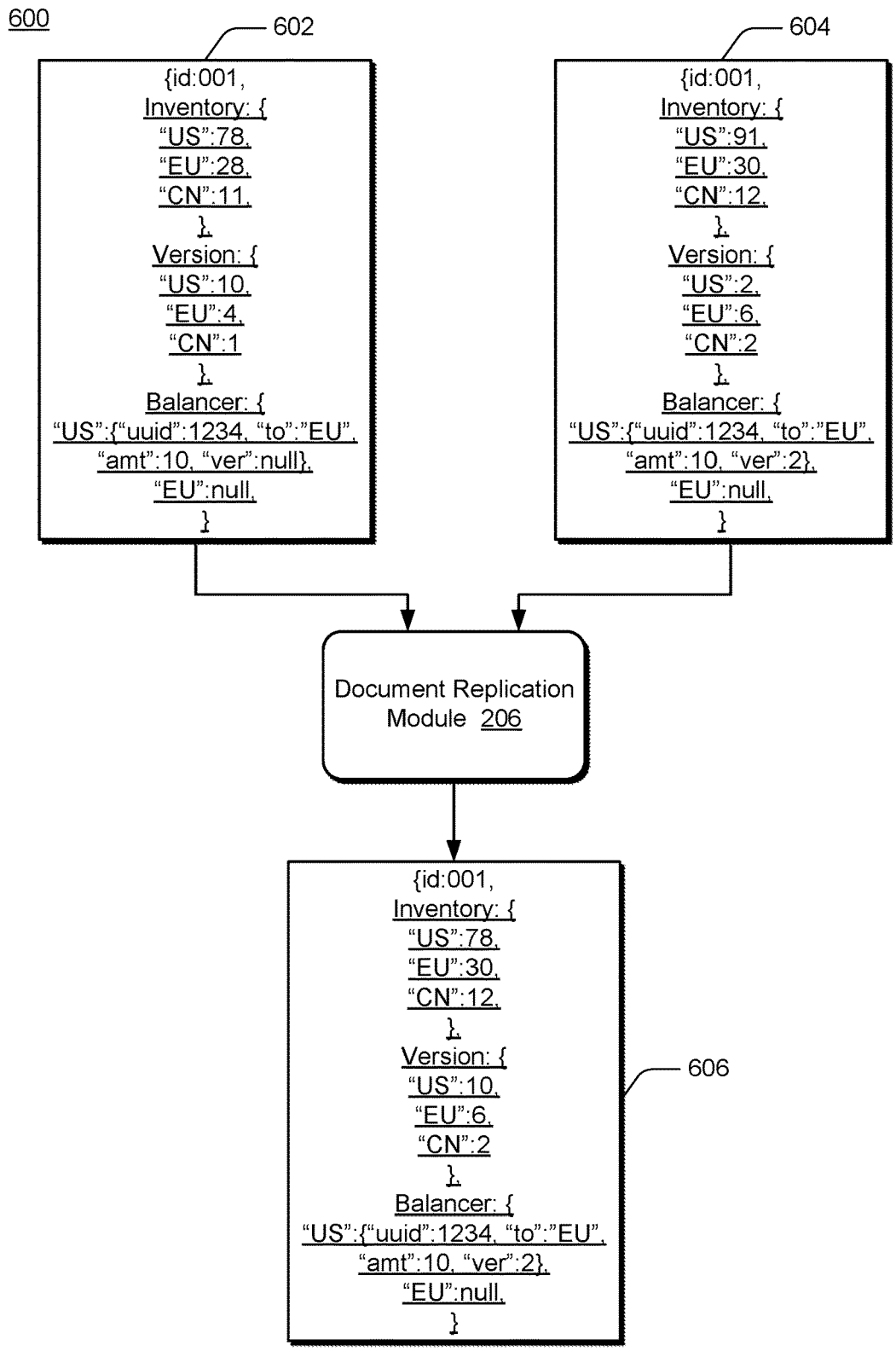
FIGS. 6 and 7 illustrate examples of merging a version of a document having a pending rebalance request and another version of the document have a rebalance request in the completed state.
Figure 7:
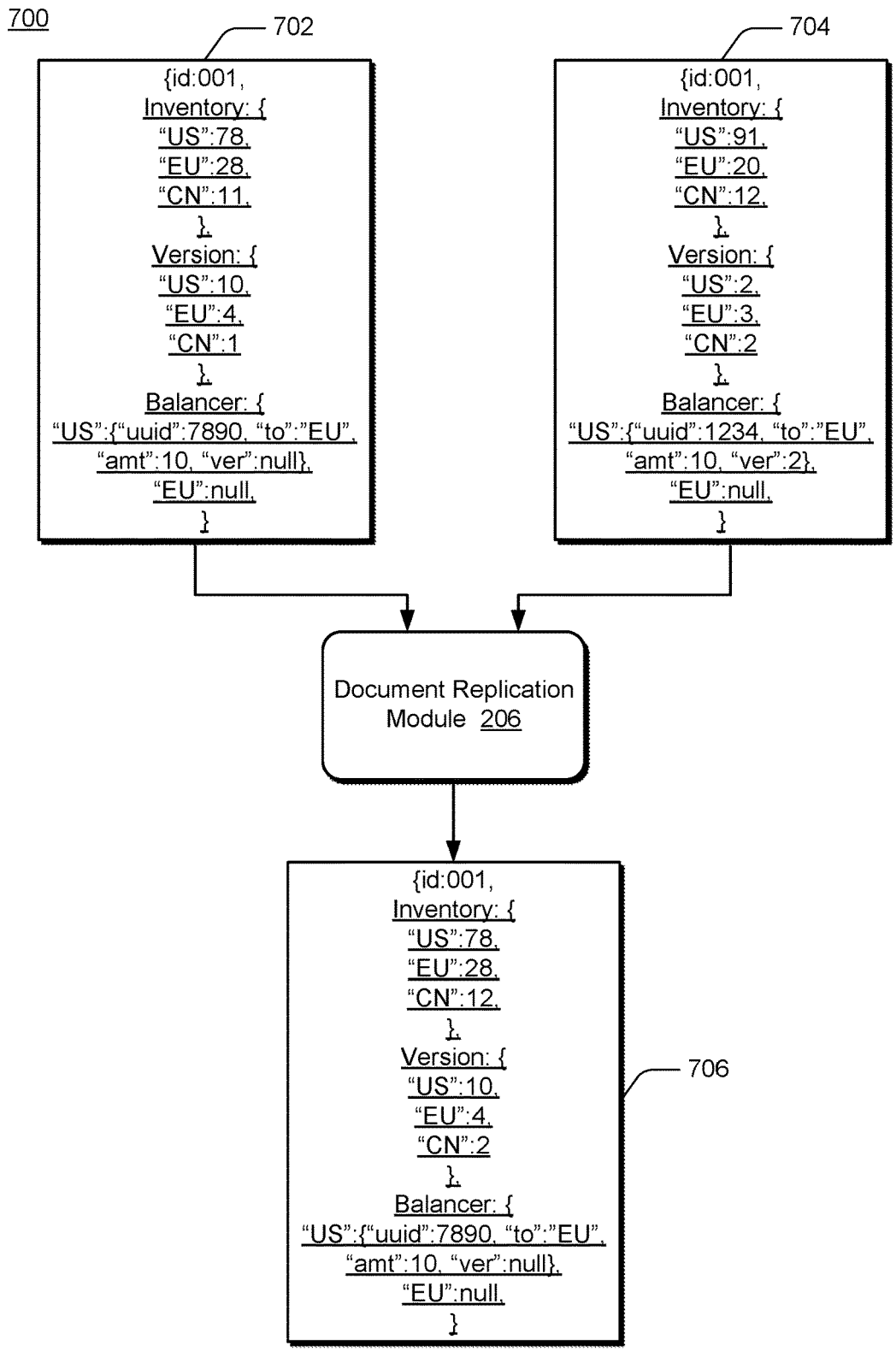

FIGS. 6 and 7 illustrate examples of merging a version of a document having a pending rebalance request and another version of the document have a rebalance request in the completed state.

Assume in the example 600 that the document replication module 208 is merging two versions 602 and 604 of a document. For each inventory count in the versions 602 and 604, the document replication module 208 uses the inventory count having the highest inventory count version. As can be seen from the versions 602 and 604, for the region "US" version 602 has the highest inventory count version (10), for the region "EU" version 604 has the highest inventory count version (6), and for the region "CN" version 604 has the highest inventory count version (2). Accordingly, the document replication module 208 includes in a merged version 606 of the document the region "US" inventory count (78) and inventory count version (10) from the version 602, the region "EU" inventory count (30) and inventory count version (6) from the version 604, and the region "CN" inventory count (12) and inventory count version (2) from the version 604.

Furthermore, for the balancer portion, the identifiers in the balancer portions of the version 602 and the version 604 are the same. Accordingly, the newer version of the balancer portion (indicating that the rebalance request is completed rather than pending) is included in the merged version 606.

With reference to FIG. 7, assume in the example 700 that the document replication module 208 is merging two versions 702 and 704 of a document. For each inventory count in the versions 702 and 704, the document replication module 208 uses the inventory count having the highest inventory count version. As can be seen from the versions 702 and 704, for the region "US" version 702 has the highest inventory count version (10), for the region "EU" version 702 has the highest inventory count version (4), and for the region "CN" version 704 has the highest inventory count version (2). Accordingly, the document replication module 208 includes in a merged version 706 of the document the region "US" inventory count (78) and inventory count version (10) from the version 702, the region "EU" inventory count (28) and inventory count version (4) from the version 702, and the region "CN" inventory count (12) and inventory count version (2) from the version 704.

Furthermore, for the balancer portion, the identifiers in the balancer portions of the version 702 and the version 704 are not the same. Thus, the inventory count version of the source region (indicated as "US" in the balancer portion) is checked. The version 702 has a higher inventory count version for the source region (10) than the version 704 has (2). Accordingly, the balancer portion from the version 702 is included in the merged version 706.

Returning to FIG. 2, data being replicated (whether as part of a rebalance request or other document update) can be communicated to other regions at various different times and in response to various different events. In one or more implementations, document replication module 208 receives replication data 228 and waits to update the document in the database 202 until document inventory update module 206 is performing an inventory count update. This keeps the updating of the document with the replication data 228 from interfering with inventory count updates due to additional accesses to the database 202 and thereby improving inventory count update performance. Additionally or alternatively, the document replication module 208 can update the document in the database 202 at other times or in response to other events, such as after a threshold amount of time passes (e.g., 10 minutes) to prevent the update from taking too long, in response to low database 202 usage (e.g., inventory count update requests being received at a rate that uses less than 25% of the database 202 access bandwidth), and so forth.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

Figure 8A:
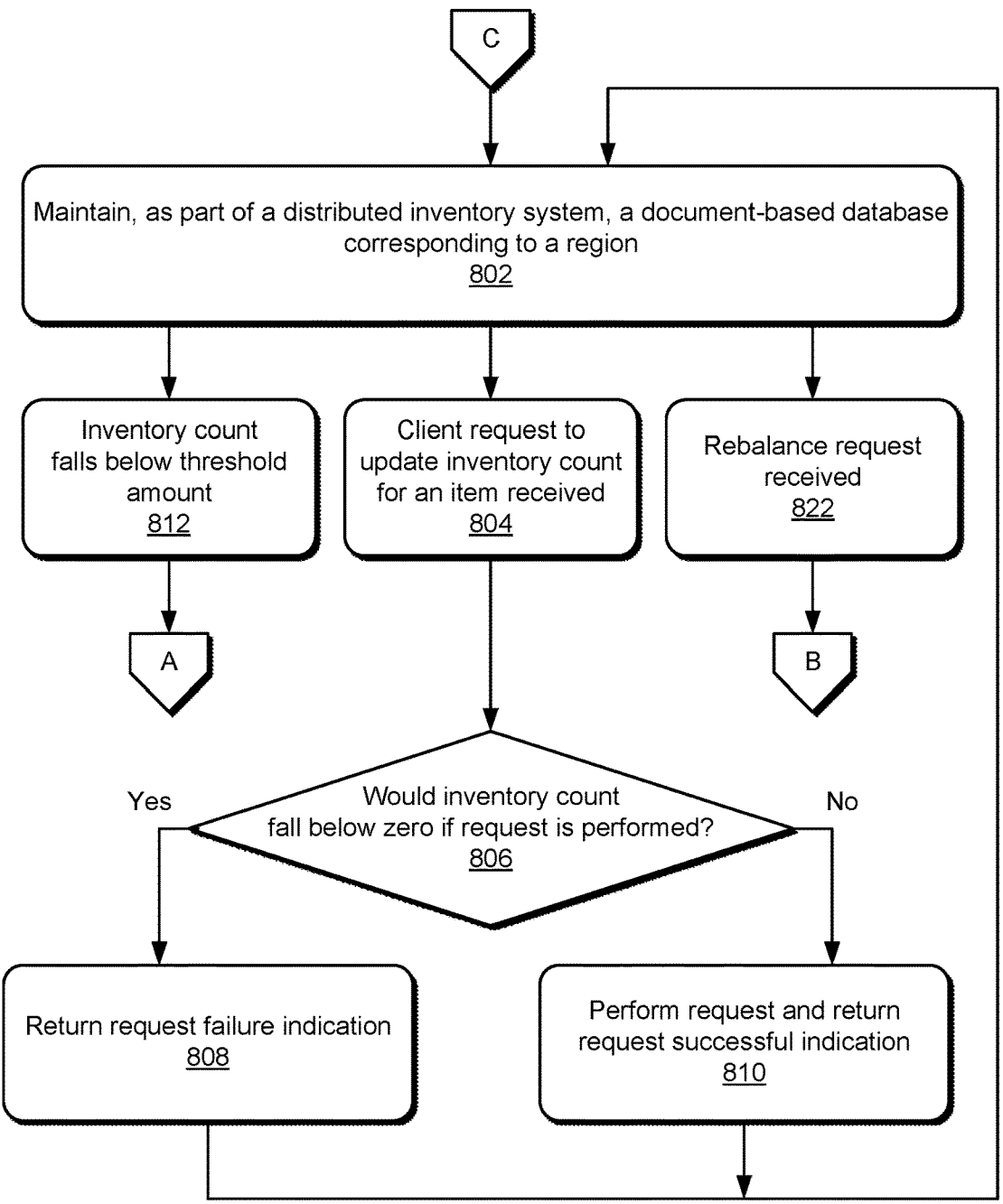
FIGS. 8A, 8B, and 8C are a flow diagram depicting a procedure in an example implementation of document-based distributed inventory system with rebalancing.
Figure 8B:
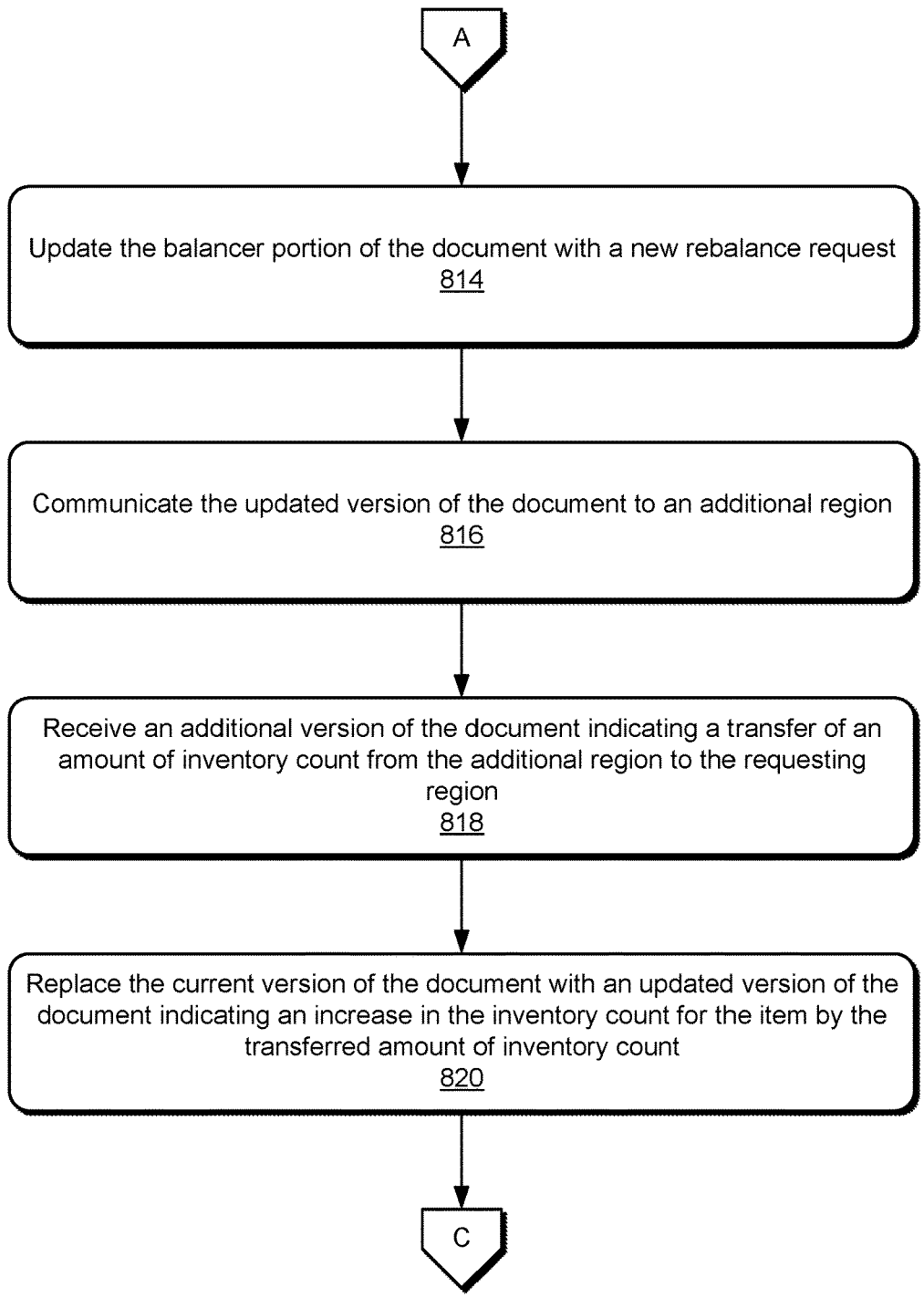
Figure 8C:
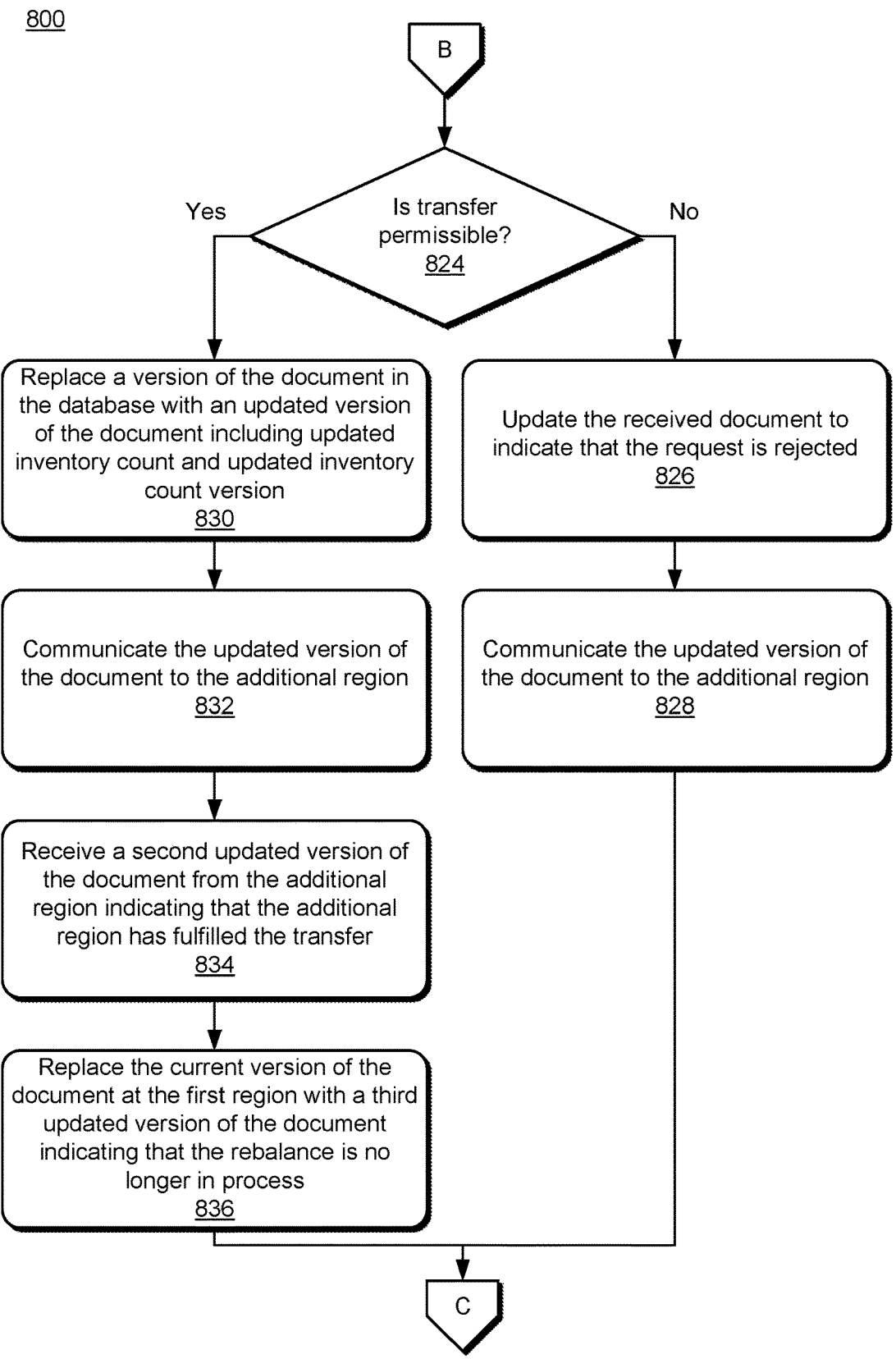

FIGS. 8A, 8B, and 8C are a flow diagram depicting a procedure in an example 800 implementation of document-based distributed inventory system with rebalancing. In this example, a document-based database corresponding to a region of a distributed inventory system is maintained (block 802 of FIG. 8A). The distributed inventory system includes multiple regions and a document-based database in each region. The document-based database includes multiple documents each indicating, for a different one of multiple items, an inventory count assigned to each of the regions for the item as well as an inventory count version.

A request to update an inventory count for an item can be received at an inventory management system associated with a region from a client (block 804). This client request can be to increase or decrease the inventory count for the item, such as due to a return or sale of an item. In one or more implementations, the client is associated with the same region as includes the database.

In response to the client request to update the inventory count for an item, a check is made as to whether the inventory count for the item assigned to the region would fall below zero if the client request is performed (block 806). If performing the client request would cause the inventory count to fall below zero, a request failure indication is returned to the client (block 808) and the request is not performed. However, if performing the client request would not cause the inventory count to fall below zero, a request success indication is returned to the client and the request is performed (block 810). Performing the request includes updating the document in the document-based database to reflect the requested inventory count update and increasing the inventory count version. After performing block 808 or 810, the procedure returns to block 802.

A determination that the inventory count for an item has fallen below a threshold amount can also be made by an inventory management system associated with a document-based database (block 812). In response to a particular inventory management system determining that the inventory count for an item has fallen below the threshold amount, the particular inventory management system updates the balancer portion of the document with a new rebalance request (block 814 of FIG. 8B). The rebalance request is a request for an additional region to transfer inventory count from the additional region to the region associated with the particular inventory management system. The updated version of the document is communicated to the additional region (block 816).

An additional version of the document indicating a transfer of an amount of inventory count from the additional region to the region associated with the particular inventory management system is received (block 818). This additional version of the document is in addition to the version of the document maintained in the document-based database.

An updated version of the document indicating an increase in the inventory count for the item by the transferred amount of inventory count is generated and replaces the version of the document previously maintained in the document-based database (block 820). The updated version of the document also includes an updated (increased) inventory count version. The procedure then returns to block 802.

A rebalance request can also be received from an additional region (block 822). This rebalance request is a request for the region receiving the request (which would be the originator of the transfer) to transfer inventory count to the requesting region. The rebalance request is included in a balancer portion of a document replicated from the requesting region as discussed above. In response to a rebalance request from an additional region, a check is made as to whether the requested transfer is permissible (block 824 of FIG. 8C). The requested transfer is permissible, for example, if a rebalance originating from the region for the item is not already in process and if performing the requested transfer would not drop the inventory count assigned to the originator region of the transfer below a threshold amount.

If the requested transfer is not permissible, then the received document is updated to indicate that the request is rejected (block 826) and the request is not performed. The document is updated to indicate that the request is rejected by, for example, deleting the rebalance request from the document. A version of the document in the database is optionally replaced with or merged with the updated version of the document, such as if there are additional inventory count changes in the document that are being communicated to the inventory management system associated with the region.

The updated version of the document is communicated to the additional region (block 828). This notifies the inventory management system associated with the additional region that the request was rejected. The procedure then returns to block 802.

However, if the requested transfer is permissible, then a version of the document in the database is replaced with an updated version of the document including updated inventory count and inventory count version (block 830). This updated inventory count is the previous inventory count for the region less the requested transfer inventory count. This updated version of the document is also communicated to the additional region (block 832).

A second updated version of the document is received from the additional region (block 834). The second updated version of the document is received after the inventory management system associated with the additional region has updated its inventory count by the requested transfer amount. The second updated version of the document indicates that the additional region has fulfilled the requested transfer.

The current version of the document in the document-based database is replaced with a third updated version of the document that indicates the rebalance is no longer in process (bock 836). The procedure then returns to block 802.

Example System and Device

Figure 9:
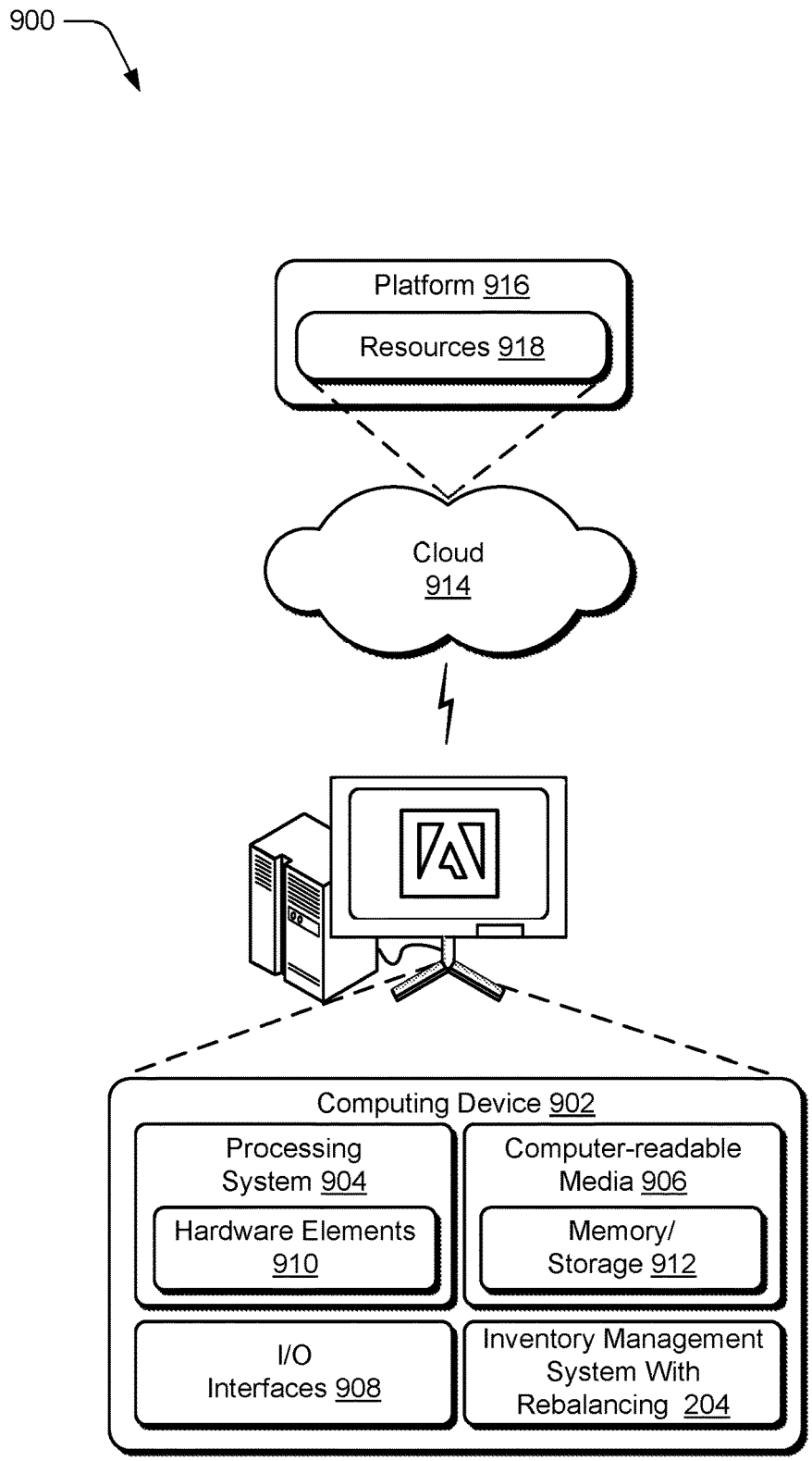
FIG. 9 illustrates an example system including various components of an example device that can be implemented as any type of computing device as described and/or utilized with reference to FIGS. 1-8 to implement aspects of the techniques described herein.

FIG. 9 illustrates an example system generally at 900 that includes an example computing device 902 that is representative of one or more computing systems and/or devices that may implement the various techniques described herein. This is illustrated through inclusion of the inventory management system with rebalancing 204 (which can be included in any of the document-based regions 104 as discussed above). The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
maintaining, by a processing device as part of a distributed inventory system, a document-based database of a first region, each document in the document-based database corresponding to a different item;
receiving, by the processing device, a request from a client device to update an inventory count for an item by a first amount, the inventory count for the item split up among multiple regions where inventory is physically located;

checking, by the processing device, a first version of a document in the document-based database indicating a current inventory count for the item assigned to the first region to determine whether performing the request would result in the current inventory count for the item falling below zero;

returning, by the processing device, in response to determining that performing the request would result in the current inventory count for the item falling below zero, an indication to the client device for display in a user interface of the client device of failure of the request without updating the current inventory count for the item by the first amount;

determining, by the processing device, that the inventory count has fallen below a threshold amount;

communicating, by the processing device, in response to determining that the inventory count has fallen below the threshold amount, a first rebalance request, for display in the user interface of the client device, to a second region of the distributed inventory system to transfer inventory count from the second region to the first region;

receiving, by the processing device, in response to the first rebalance request, a second version of the document indicating a transfer of a second amount of inventory count from the second region to the first region;

transferring a number of items corresponding to the second amount of inventory count from the second region to the first region; and replacing, by the processing device, the first version of the document with a third version of the document indicating an increase in the current first inventory count for the item by the second amount, the third version of the document generated by merging the first version of the document with the second version of the document and updating the current inventory count for the item in each region to be equal to a highest inventory count indicated by the first version of the document or the second version of the document.

2. The method of claim 1, further comprising in response to determining that performing the request would not result in the current inventory count for the item falling below zero:

updating the first version of the document to a fourth version of the document indicating a change in the current inventory count by for the item by the first amount;

replacing the first version of the document with the fourth version of the document;

returning to the client device an indication of success of the request; and communicating the fourth version of the document to the second region.

3. The method of claim 1, the third version of the document including an identifier of the item, the current inventory count assigned to the first region, an inventory count assigned to the second region, a version of the current inventory count assigned to the first region, and a version of the inventory count assigned to the second region.

4. The method of claim 3, further comprising:
receiving a fourth version of the document from the second region;
determining that the version of the inventory count assigned to the second region in the fourth version of the document is greater than the version of the inventory count assigned to the second region in the third version of the document; and replacing the third version of the document with a fifth version of the document indicating an inventory count assigned to the second region obtained from the fourth version of the document and indicating an inventory count version for the second region obtained from the fourth version of the document.

5. The method of claim 1, further comprising:
receiving a second rebalance request to transfer a third amount of inventory count for the item to a third region;
determining that transferring the third amount of inventory count from the first region to the third region is not permissible in response to a rebalance originating from the first region for the item already being in process; and
not transferring the third amount of inventory count to the third region in response to determining that transferring the third amount of inventory count from the first region to the third region is not permissible.

6. The method of claim 1, further comprising:
receiving a second rebalance request to transfer a third amount of inventory count for the item to a third region;
determining that transferring the third amount of inventory count from the first region to the third region is not permissible in response to determining that removing the third amount of inventory count from the inventory count at the first region would drop the inventory count at the first region below the threshold amount; and
not transferring the third amount of inventory count to the third region in response to determining that transferring the third amount of inventory count from the first region to the third region is not permissible.

7. The method of claim 1, further comprising:
receiving a second rebalance request to transfer a third amount of inventory count for the item to a third region; and
transferring the third amount of inventory count to the third region only in response to determining that a rebalance originating from the first region for the item is not already in process and that removing the third amount of inventory count from the inventory count at the first region would not drop the inventory count at the first region below the threshold amount.

8. In a digital medium environment to provide a distributed inventory system, a processing device at a first region comprising:
a processor; and
computer-readable storage media having stored multiple instructions that, responsive to execution by the processor, cause the processor to perform operations including:
maintaining, at the first region, a document-based database including a first version of a document indicating, for an item, a current inventory count assigned to the first region, each document in the document-based database corresponding to a different item;
receiving, from a second region, a rebalance request from a client device that identifies the item of inventory and requests to transfer a first amount of inventory count for the item from the first region to the second region, the inventory count for the item split up among multiple regions where inventory is physically located;
determining whether transferring the first amount of inventory count from the first region to the second region is permissible based on an identity of the item; and in response to determining that transferring the first amount of inventory count from the first region to the second region is permissible:
   replacing the first version of the document with a second version of the document having an inventory count decreased by the first amount and indicating that a rebalance originating from the first region is in process;
   communicating the second version of the document to the second region;
   receiving a third version of the document from the second region indicating that an inventory count for the item assigned to the second region has been updated at the second region to include the first amount of inventory, the third version of the document generated by merging the first version of the document with the second version of the document and updating the current inventory count for the item in each region to be equal to a highest inventory count indicated by the first version of the document or the second version of the document; and
   replacing the second version of the document at the first region with a fourth version of the document indicating that the rebalance originating from the first region is no longer in process.

9. The processing device of claim 8, the determining whether transferring the first amount of inventory count from the first region to the second region is permissible comprising determining the transferring is not permissible in response to determining that a rebalance originating from the first region for the item is already in process.

10. The processing device of claim 8, the determining whether transferring the first amount of inventory count from the first region to the second region is permissible comprising determining the transferring is not permissible in response to determining that removing the first amount of inventory count from the inventory count at the first region would drop the inventory count at the first region below a threshold amount.

11. The processing device of claim 8, the first version of the document including an identifier of the item, the current inventory count assigned to the first region, an inventory count assigned to the second region, a version of the current inventory count assigned to the first region, and a version of the inventory count assigned to the second region.

12. The processing device of claim 11, the second version of the document including the identifier of the item, an updated inventory count assigned to the first region that is the current inventory count assigned to the first region decreased by the first amount of inventory count, the inventory count assigned to the second region, a version of the updated inventory count assigned to the first region, the version of the inventory count assigned to the second region, and a balancer indicating that a rebalance originating from the first region for the item is in process.

13. The processing device of claim 12, the balancer including an identifier of the first region, an identifier of the balancer, an identifier of the second region, the first amount of inventory count, and a default value indicating that the second region has not fulfilled the inventory count transfer.

14. The processing device of claim 13, the third version of the document including an updated balancer that includes the identifier of the first region, the identifier of the balancer, the identifier of the second region, the first amount of inventory count, and an inventory count version in which the second region fulfilled the inventory count transfer.

15. The processing device of claim 8, the operations further including generating the fourth version of the document by:
   obtaining a fifth version of the document from the document-based database;
   merging the third version of the document and the fifth version of the document, the merging including:
      for each region, using as the region inventory count in the fourth version of the document the region inventory count from the fifth version of the document or the third version of the document having a largest inventory count version, and using as the inventory count version for the region in the fourth version of the document the largest inventory count version;
   including an indication to the fourth version of the document that the rebalance originating from the first region is no longer in process.

16. The processing device of claim 8, the operations further including:
   determining that a balancer in the third version of the document has an inventory count version in which the second region fulfilled the inventory count transfer that is at least equal to a current inventory count version for the second region; and
   the replacing the second version of the document with the fourth version of the document comprising replacing the second version of the document with the fourth version of the document in response to determining that the balancer in the third version of the document has the inventory count version in which the second region fulfilled the inventory count transfer that is at least equal to the current inventory count version for the second region.

17. A system comprising:
   a document-based database corresponding to a region of a distributed inventory system, the document-based database including multiple documents each indicating, for a different one of multiple items, an inventory count assigned to each of the multiple regions for the item;
   a communication module, implemented at least in part in hardware, to send rebalance requests to a client device and replication data to one or more additional regions in the distributed inventory system, and to receive rebalance requests from a client device and replication data from the one or more additional regions;
   means for updating one of the multiple documents to change an inventory count assigned to the region for an item to a highest inventory count indicated by the multiple documents in response to an inventory count update request from the client device, the inventory count for the item split up among multiple regions where inventory is physically located;
   means for transferring inventory count to an additional region in response to a rebalance request received from the additional region; and
   means for transferring a number of items corresponding to the inventory count from the region to the additional region.

18. The system of claim 17, the means for updating comprising means for updating the one of the multiple documents to change the inventory count assigned to the region for the item only in response to determining that the requested inventory count update would not result in the inventory count assigned to the region for the item falling below zero.

19. The system of claim 17, the means for transferring inventory count comprising means for transferring inventory count to the additional region only in response to determining both that a rebalance originating from a first region for the item is not already in process and that removing the requested inventory count update from the inventory count assigned to the region for the item would not drop the inventory count assigned to the region for the item below a threshold amount.

20. The method of claim 1, wherein updates to the current inventory count for the item in each region are performed in order of receipt.

* * * * *